(12) United States Patent
Isobe et al.

(10) Patent No.: US 10,406,677 B2
(45) Date of Patent: Sep. 10, 2019

(54) PARALLEL LINK MECHANISM AND LINK ACTUATION DEVICE

(71) Applicant: NTN CORPORATION, Osaka (JP)

(72) Inventors: Hiroshi Isobe, Iwata (JP); Seigo Sakata, Iwata (JP); Naoya Konagai, Iwata (JP); Hiroyuki Yamada, Iwata (JP)

(73) Assignee: NTN CORPORATION, Osaka (JP)

( * ) Notice: Subject to any disclaimer, the term of this patent is extended or adjusted under 35 U.S.C. 154(b) by 436 days.

(21) Appl. No.: 15/280,408

(22) Filed: Sep. 29, 2016

(65) Prior Publication Data

US 2017/0014994 A1    Jan. 19, 2017

Related U.S. Application Data

(63) Continuation of application No. PCT/JP2015/058731, filed on Mar. 23, 2015.

(30) Foreign Application Priority Data

Mar. 31, 2014    (JP) .................................. 2014-072281

(51) Int. Cl.
    *B25J 9/08*       (2006.01)
    *B25J 9/00*       (2006.01)
    *F16H 21/46*      (2006.01)

(52) U.S. Cl.
    CPC .......... *B25J 9/0048* (2013.01); *B25J 9/0009* (2013.01); *B25J 9/08* (2013.01); *F16H 21/46* (2013.01)

(58) Field of Classification Search
    CPC . B25J 9/0048; B25J 9/0009; B25J 9/08; B25J 21/46
    See application file for complete search history.

(56) References Cited

U.S. PATENT DOCUMENTS

| 5,656,905 A | * | 8/1997 | Tsai | ..................... B23Q 1/5462 |
| | | | | 318/560 |
| 5,893,296 A | * | 4/1999 | Rosheim | .................. G05G 5/03 |
| | | | | 74/490.03 |

(Continued)

FOREIGN PATENT DOCUMENTS

| CN | 1418763 A | 5/2003 |
| CN | 1878640 A | 12/2006 |

(Continued)

OTHER PUBLICATIONS

International Search Report dated Jun. 2, 2015 in corresponding International Application No. PCT/JP2015/058731.

(Continued)

*Primary Examiner* — David M Fenstermacher

(57) ABSTRACT

In this parallel link mechanism, a distal end side link hub is coupled to a proximal end side link hub via three or more link mechanisms such that the posture of the distal end side link hub can be altered relative to the proximal end side link hub. Each link mechanism includes proximal side and distal side end link members and an intermediate link member. Each end link member includes: a curved member curved by an arbitrary angle; and a rotation shaft support member fixed to one end of or each of opposite ends of the curved member, and configured to support a rotation shaft rotatably coupled directly or via a bearing to the intermediate link member or the link hub.

10 Claims, 13 Drawing Sheets

(56) References Cited

U.S. PATENT DOCUMENTS

| | | | | |
|---|---|---|---|---|
| 5,979,264 | A * | 11/1999 | Rosheim | B25J 17/0266 74/490.03 |
| 6,418,811 | B1 * | 7/2002 | Rosheim | B25J 17/0266 414/729 |
| 7,478,576 | B2 * | 1/2009 | Rosheim | B25J 17/0266 74/490.01 |
| 8,109,171 | B2 * | 2/2012 | Nakao | B25J 17/0266 267/69 |
| 8,181,551 | B2 * | 5/2012 | Breu | B25J 17/0266 74/490.01 |
| 9,243,696 | B2 * | 1/2016 | Isobe | B25J 9/0048 |
| 9,249,869 | B2 * | 2/2016 | Isobe | F16H 21/54 |
| 9,316,266 | B2 * | 4/2016 | Isobe | F16D 3/30 |
| 9,533,420 | B2 * | 1/2017 | Sone | B25J 9/0048 |
| 9,746,037 | B2 * | 8/2017 | Sone | B25J 9/0048 |
| 9,821,454 | B2 * | 11/2017 | Isobe | B23K 9/12 |
| 10,022,827 | B2 * | 7/2018 | Isobe | B25J 9/0048 |
| 10,156,265 | B2 * | 12/2018 | Harris | F16D 3/30 |
| 10,160,120 | B2 * | 12/2018 | Hirano | B25J 19/0029 |
| 2005/0199085 | A1 | 9/2005 | Isobe et al. | |
| 2008/0028881 | A1 | 2/2008 | Sone et al. | |
| 2014/0014219 | A1 | 1/2014 | Takemura et al. | |
| 2014/0224046 | A1 | 8/2014 | Isobe et al. | |

FOREIGN PATENT DOCUMENTS

| | | |
|---|---|---|
| EP | 0 987 087 A2 | 3/2000 |
| EP | 2 674 265 A1 | 12/2013 |
| JP | 2000-94245 | 4/2000 |
| JP | 2001-259865 | 9/2001 |
| JP | 2013-68280 | 4/2013 |

OTHER PUBLICATIONS

Extended European Search Report dated Jan. 26, 2018 in corresponding European Patent Application No. 15773915.2, 5 pgs.
Office Action dated Dec. 25, 2017 in corresponding Chinese Patent application No. 201580017039.7, 8 pp.
International Preliminary Report on Patentability dated Oct. 13, 2016 in corresponding International Patent Application No. PCT/JP2015/058731.
Japanese Office Action dated Aug. 8, 2017 in corresponding Japanese Patent Application No. 2014-072281.

* cited by examiner

PARALLEL LINK MECHANISM AND LINK ACTUATION DEVICE

CROSS REFERENCE TO THE RELATED APPLICATION

This application is a continuation application, under 35 U.S.C § 111(a) of international patent application No. PCT/JP2015/058731, filed Mar. 23, 2015, which claims priority to Japanese patent application No. 2014-072281, filed Mar. 31, 2014, the entire disclosure of which is herein incorporated by reference as a part of this application.

BACKGROUND OF THE INVENTION

Field of the Invention

The present invention relates to a parallel link mechanism and a link actuation device to be used in a device, such as a medical device or an industrial device, which operates fast and with high accuracy and requires a wide operating range.

Description of Related Art

Parallel link mechanisms to be used in various types of work devices such as medical devices and industrial devices are proposed in Patent Documents 1 and 2 listed below.

RELATED DOCUMENT

Patent Document

[Patent Document 1] JP Laid-open Patent Publication No. 2000-094245

[Patent Document 2] U.S. Pat. No. 5,893,296

The parallel link mechanism of Patent Document 1 has a comparatively simple configuration, but the operating angle of each link is small. Thus, there is a problem in that if the operating range of the travelling plate is set to be large, the link length is increased, causing large dimensions of the entire mechanism, thus resulting in an enlarged device. There is also a problem in that the rigidity of the mechanism as a whole is low, which limits the weight of a tool mounted on the travelling plate, i.e., the weight capacity of the travelling plate, to a small value.

The parallel link mechanism of Patent Document 2 has a configuration in which a distal end side link hub is coupled to a proximal end side link hub such that the posture of the distal end side link hub relative to the proximal end side link hub can be altered via three or more quadric chain link mechanisms. Accordingly, the parallel link mechanism of Patent Document 2 can be compact in size but can perform fast and highly accurate operation in a wide operating range.

However, the parallel link mechanism of Patent Document 2 has a problem in that the component configuration is complicated and assemblability is bad. In addition, there is also a problem in that, in order to ensure rigidity and strength, each component has a complicated shape, causing low mass productivity and high manufacturing cost. Further, since common use of components is difficult, a change in specification such as size or the like causes almost all components to be newly manufactured.

SUMMARY OF THE INVENTION

It is an object of the present invention to provide an inexpensive and high-rigidity parallel link mechanism which can perform fast and highly accurate operation in a wide operating range, and which allows easy assembling and easy specification change.

It is another object of the present invention to provide a link actuation device which can control angles in two degrees of freedom, which can accurately perform operation in a wide operating range, and which can be manufactured at low cost.

A parallel link mechanism of the present invention includes: a proximal end side link hub; a distal end side link hub; and three or more link mechanisms which each couple the distal end side link hub to the proximal end side link hub such that a posture of the distal end side link hub can be altered relative to the proximal end side link hub, in which case each of the link mechanisms includes: a proximal side end link member having one end rotatably coupled to the proximal end side link hub; a distal side end link member having one end rotatably coupled to the distal end side link hub; and an intermediate link member having opposite ends rotatably coupled to other ends of the proximal side and distal side end link members, respectively. Each of the proximal side and distal side end link members includes: a curved member which is curved by an arbitrary angle; and a rotation shaft support member fixed to one end of or each of opposite ends of the curved member, which rotation shaft support member is configured to support a rotation shaft rotatably coupled directly or via a bearing to the intermediate link member or a one of the proximal end side and distal end side link hubs.

In this specification, "proximal end side" and "distal end side" are used in the following meaning. That is, the point where the central axis of the revolute pair between a link hub and each end link member, and the central axis of the revolute pair between each end link member and its corresponding intermediate link member cross each other is referred to as the "spherical link center" of the link hub. Moreover, the straight line that passes this spherical link center and that crosses the central axis of the revolute pair between the link hub and the end link member at a right angle is referred to as the "central axis of the link hub". At this time, when the link hubs are viewed from the intersection where the central axes of the link hubs on the proximal end side and the distal end side cross each other, the proximal-end-side spherical link center direction will be referred to as proximal end side, and the distal-end-side spherical link center direction will be referred to as distal end side.

According to this configuration, the proximal end side link hub, the distal end side link hub, and the three or more link mechanisms form a two-degrees-of-freedom mechanism in which the distal end side link hub is rotatable in two axial directions perpendicular to each other, relative to the proximal end side link hub. This two-degrees-of-freedom mechanism is compact in size but can realize a wide range of movement of the distal end side link hub. For example, the maximum bend angle between the central axis of the proximal end side link hub and the central axis of the distal end side link hub can be about ±90°, and the angle of traverse of the distal end side link hub relative to the proximal end side link hub can be set in a range of 0° to 360°.

Since each of the proximal side and distal side end link members is divided into two kinds of members, i.e., the curved member and the rotation shaft support member, each member can be made in a simple shape. Accordingly, processing cost can be suppressed, whereby mass productivity is improved. In addition, at the time of assembling, components that form the revolute pair portions between the proximal side and distal side end link members and the intermediate link member, or the revolute pair portion between the proximal side (distal side) end link member and the proximal end side (distal end side) link hub, such as the bearings and the spacers, can be inserted to the rotation shaft from one direction. This improves assemblability.

In the present invention, preferably, the rotation shaft support member is a plate-shaped member, e.g., a metal plate, which has a constant thickness and which is provided with a through-hole into which the rotation shaft, or the rotation shaft and the bearing are inserted. By using a plate-shaped member having a constant thickness, which is in a simple shape, a rotation shaft support member which is inexpensive and excellent in mass productivity can be realized. In particular, when a metal plate is used as the rotation shaft support member, processing is easy.

In the present invention, preferably, the rotation shaft support member is fixed to the curved member in a state where the rotation shaft support member is positioned by a positioning pin. By using the positioning pin, assembling is rendered to be easy, and thus, variation in accuracy of assembling performed by an operator is reduced. In addition, since accuracy in the positional relationship between the curved member and the rotation shaft support member is improved, smooth operation of the parallel link mechanism can be realized.

In the present invention, each of the proximal side and distal side end link members may include two or more of the rotation shaft support members, and the two or more rotation shaft support members may support opposite ends of the rotation shaft. At this time, preferably, the two or more rotation shaft support members have an identical shape with each other. By supporting the opposite ends of the rotation shaft by the two or more rotation shaft support members, the rigidity against moment load of the revolute pair portion is increased, and the rigidity of the entirety of the parallel link mechanism is improved. When the two or more rotation shaft support members have an identical shape, common use of components is achieved, which can realize a low price and good mass productivity.

The present invention may employ a configuration in which: each of the proximal side and distal side end link members includes two or more of the rotation shaft support members at each of opposite ends thereof; and the two or more rotation shaft support members at one end support opposite ends of the rotation shaft rotatably coupled to the intermediate link member and the two or more rotation shaft support members at the other end support opposite ends of the rotation shaft rotatably coupled to a corresponding one of the proximal end side and distal end side link hubs.

With this configuration, even if the specification of the parallel link mechanism is changed, components can be used in common. For example, when the size of the parallel link mechanism is to be changed, only the shape of the curved member is changed, and the rotation shaft support member and the rotation shaft can be used in common. Further, when the sizes of the bearings to be used in the revolute pair portions between the proximal side and distal side end link members and the intermediate link member, and in the revolute pair portion between the proximal side (distal side) end link member and the proximal end side (distal end side) link hub are to be changed, the shapes of the rotation shaft support member and the rotation shafts are changed, and the curved member can be used in common.

In a link actuation device of the present invention including the parallel link mechanism of the present invention, two or more link mechanisms of the three or more link mechanisms in the parallel link mechanism are each provided with a posture altering actuator configured to arbitrarily alter the posture of the distal end side link hub relative to the proximal end side link hub. When two or more link mechanisms of the three or more link mechanisms are each provided with the posture altering actuator, the posture of the distal end side link hub relative to the proximal end side link hub can be determined. Accordingly, a link actuation device that can control angles in two degrees of freedom can be realized at low cost.

The link actuation device may have a configuration in which: the posture altering actuator is a rotary actuator whose output shaft has a flange surface perpendicular to a center line of the output shaft; and the proximal side end link member has the rotation shaft support member configured to support the rotation shaft rotatably coupled to the proximal end side link hub; and the rotation shaft support member is joined to the flange surface of the posture altering actuator. With this configuration, the posture altering actuator can be directly installed to the parallel link mechanism. This allows a drive mechanism section to have a simple structure, and thus, an inexpensive link actuation device can be realized.

The link actuation device may have a configuration in which: the posture altering actuator is a rotary actuator provided with a speed reducing mechanism; an output shaft of the speed reducing mechanism has a flange surface perpendicular to a center line of the output shaft; the proximal side end link member has the rotation shaft support member configured to support the rotation shaft rotatably coupled to the proximal end side link hub; and the rotation shaft support member is joined to the flange surface of the posture altering actuator. With this configuration, by using the rotary actuator provided with the speed reducing mechanism, allowable load can be improved. Since the ratio of moment of inertia can be reduced, fast operation can be realized.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

A parallel link mechanism according to a preferred embodiment of the present invention will be described with reference to FIG. 1 to FIG. 7.

Figure 1:
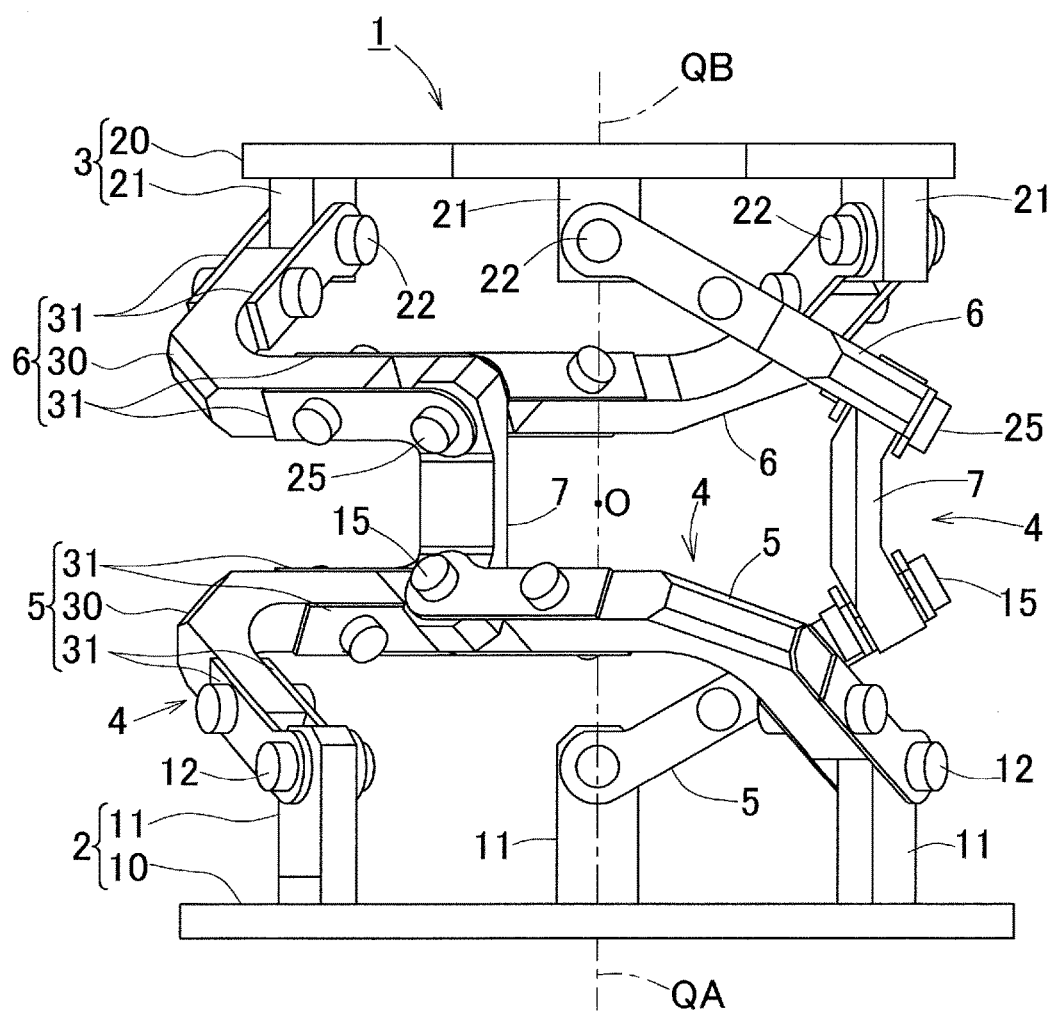
FIG. 1 is a front view of one state of a parallel link mechanism according to a preferred embodiment of the present invention.
Figure 2:
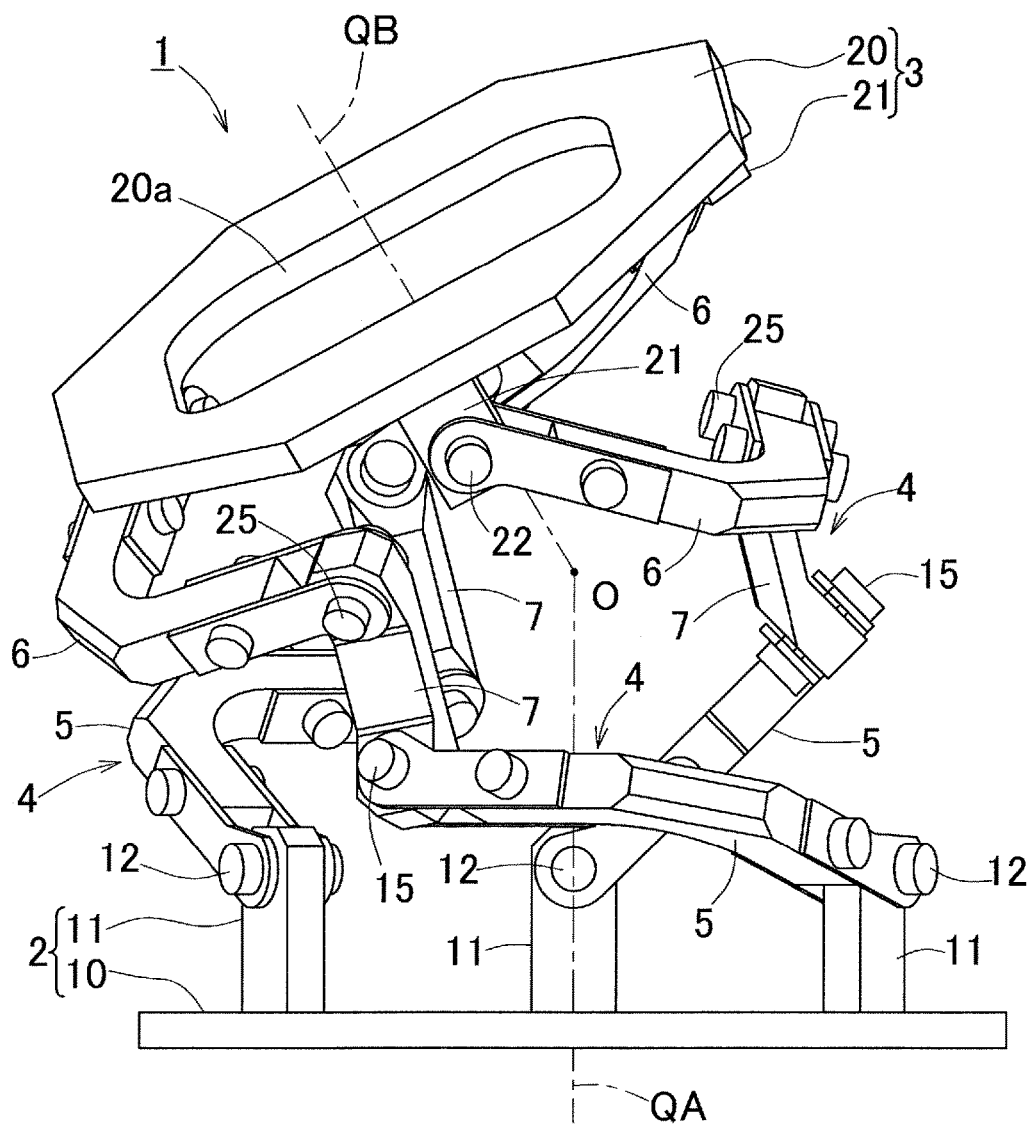
FIG. 2 is a front view of a different state of the parallel link mechanism.
Figure 3:
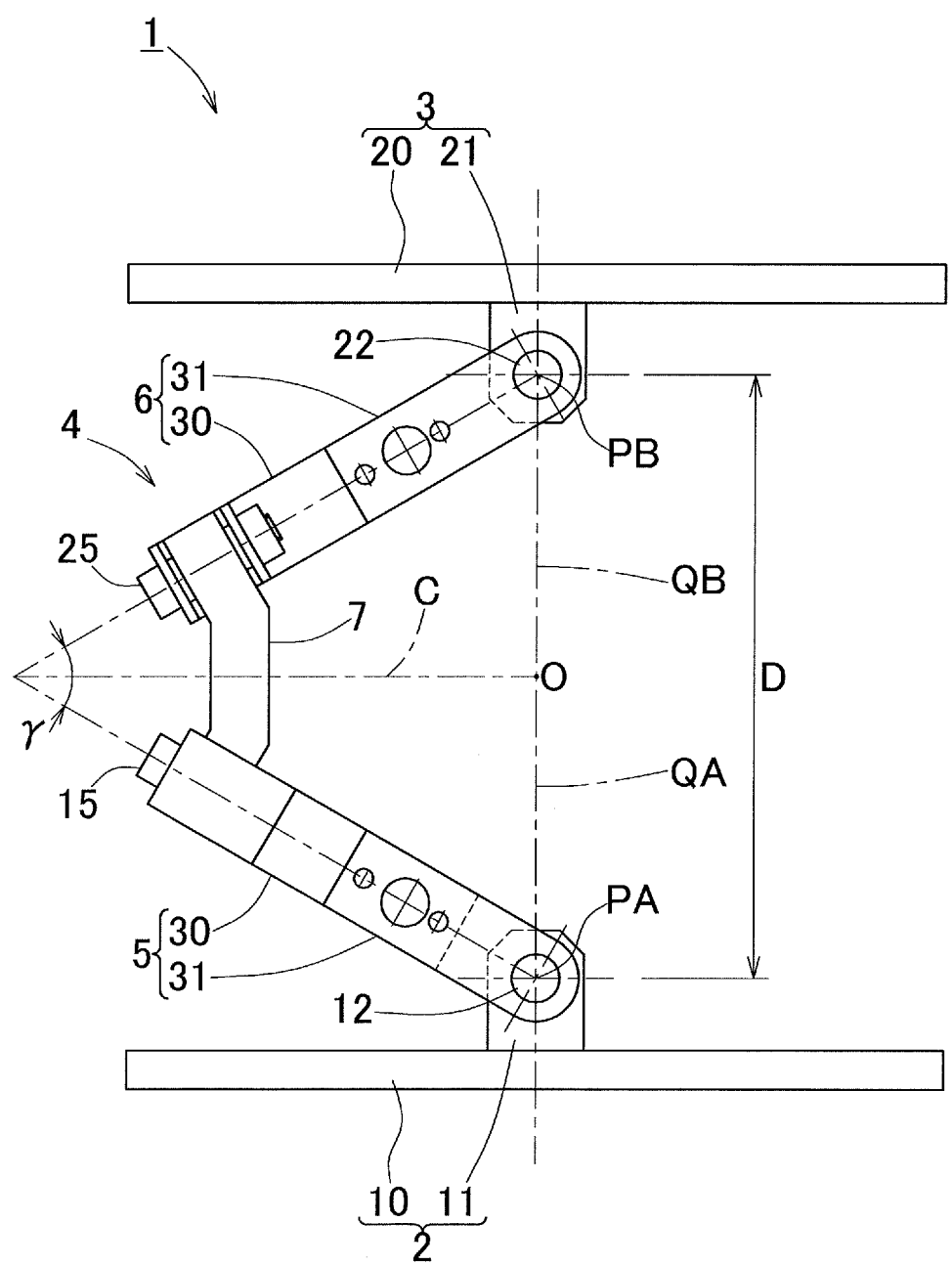
FIG. 3 is a front view of the parallel link mechanism with part thereof omitted.

FIG. 1 and FIG. 2 are front views respectively showing different states of the parallel link mechanism. FIG. 3 is a front view showing the parallel link mechanism with part thereof omitted. This parallel link mechanism 1 is of a type in which a distal end side link hub 3 is coupled to a proximal end side link hub 2 via three link mechanisms 4 such that the posture of the distal end side link hub 3 can be altered relative to the proximal end side link hub 2. FIG. 3 shows only one link mechanism 4. The number of the link mechanisms 4 may be four or more.

Each link mechanism 4 includes a proximal side end link member 5, a distal side end link member 6, and an intermediate link member 7, and forms a quadric chain link mechanism composed of four revolute pairs. The proximal side and distal side end link members 5 and 6 each have an L-shape, and one-ends of the proximal side and distal side end link members 5 and 6 are rotatably coupled to the proximal end side link hub 2 and the distal end side link hub 3, respectively. The intermediate link member 7 has its opposite ends rotatably coupled to the other ends of the proximal side and distal side end link members 5 and 6, respectively.

The parallel link mechanism 1 is formed by combining two spherical link mechanisms. The central axes of the revolute pairs between the proximal end side and distal end side link hubs 2, 3 and the proximal side and distal side end link members 5, 6, and the central axes of the revolute pairs between the proximal side and distal side end link members 5, 6 and the intermediate link members 7 cross each other at their corresponding proximal end side and distal end side spherical link centers PA, PB (FIG. 3).

Further, the distances from the three revolute pairs between the proximal side and distal side end link members 5, 6 and the proximal end side and distal end side link hubs 2, 3 to the proximal end side and distal end side spherical link centers PA, PB are respectively identical. Further, the distances from the three revolute pairs between the proximal side and distal side end link members 5, 6 and the intermediate link members 7 to the proximal end side and distal end side spherical link centers PA, PB are respectively identical. The central axis of the revolute pair between the proximal side end link member 5 and the intermediate link member 7 and the central axis of the revolute pair between the distal side end link member 6 and the intermediate link member 7 may form a certain cross angle γ (FIG. 3) or may be parallel.

Figure 4:
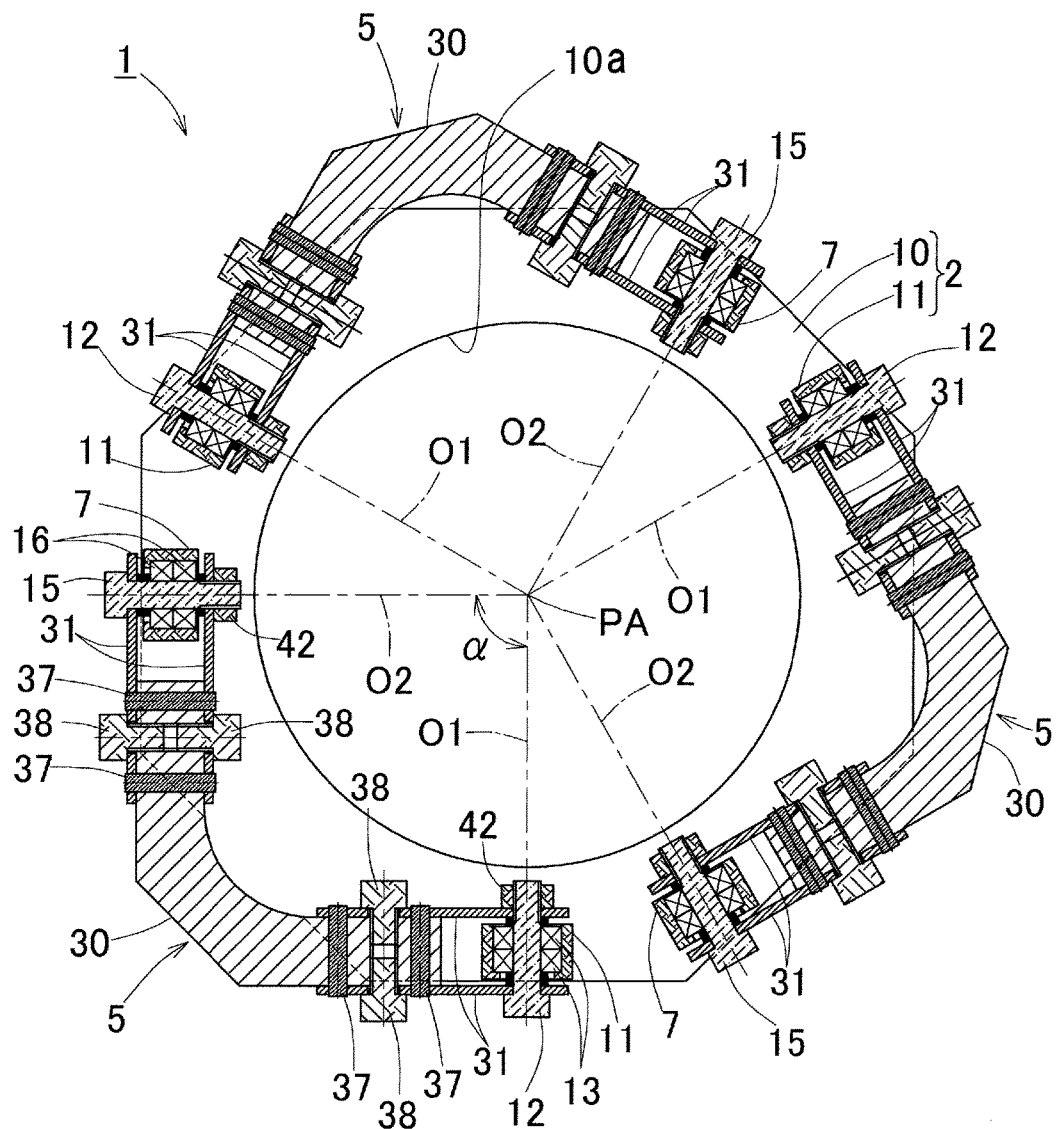
FIG. 4 is a cross-sectional view of a proximal end side link hub, proximal side end link members, and the like of the parallel link mechanism.

FIG. 4 is a cross-sectional view of the proximal end side link hub 2, the proximal side end link members 5, and the like. FIG. 4 shows the relationship between the proximal end side spherical link center PA, and central axes O1 of the revolute pairs between the proximal side end link members 5 and the proximal end side link hub 2. The shape and the positional relationship of the distal end side link hub 3 and the distal side end link members 6 are the same as those shown in FIG. 4 (not shown). In the example shown in FIG. 4, an angle α between the central axis O1 of the revolute pair between each proximal side end link member 5 and the proximal end side link hub 2, and a central axis O2 of the revolute pair between the proximal side end link member 5 and its corresponding intermediate link member 7 is 90°. However, the angle α may be an angle other than 90°.

Figure 5:
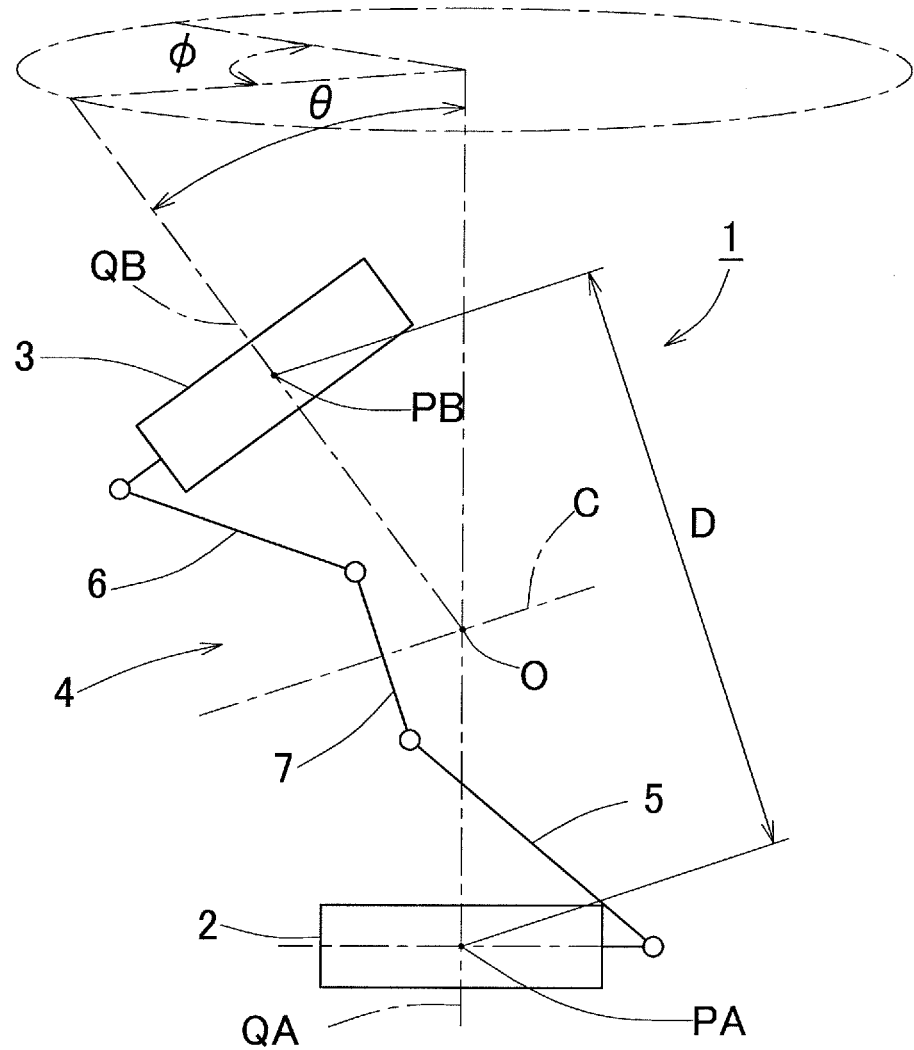
FIG. 5 is a diagram showing one link mechanism of the parallel link mechanism depicted in straight lines.

The three link mechanisms 4 have a geometrically identical configuration. The geometrically identical configuration means that, as shown in FIG. 5, a geometric model depicted in straight lines representing each link member 5, 6, 7, i.e., a model depicted with the revolute pairs and straight lines connecting these revolute pairs, represents a shape in which the proximal end side portion thereof and the distal end side portion thereof are symmetrical with each other with respect to the center of the intermediate link member 7. FIG. 5 is a diagram showing one link mechanism 4 depicted in straight lines. The parallel link mechanism 1 of the present embodiment is of a rotation symmetrical type, and employs a positional configuration in which a proximal side positional relationship between the proximal end side link hub 2 and the proximal side end link member 5, and a distal side positional relationship between the distal end side link hub 3 and the distal side end link member 6 are in rotation symmetry relative to a center line C of the intermediate link member 7.

The proximal end side link hub 2, the distal end side link hub 3, and the three link mechanisms 4 form a two-degrees-of-freedom mechanism in which the distal end side link hub 3 is rotatable in two axial directions perpendicular to each other relative to the proximal end side link hub 2. In other words, this mechanism allows the distal end side link hub 3 to rotate with two degrees of freedom to alter its posture, relative to the proximal end side link hub 2. This two-degrees-of-freedom mechanism is compact in size, but can realize a wide range of movement of the distal end side link hub 3 relative to the proximal end side link hub 2.

For example, when the straight lines that respectively pass the proximal end side and distal end side spherical link centers PA, PB and that cross at a right angle the central axes O1 (FIG. 4) of the revolute pairs between the proximal side and distal side end link members 5, 6 and the proximal end side and distal end side link hubs 2, 3 are defined as central axes QA, QB of the proximal end side and distal end side link hubs 2, 3 (hereinafter referred to as "proximal end side and distal end side link hub central axes QA and QB"), the maximum value of a bend angle θ (FIG. 5) between the proximal end side link hub central axis QA and the distal end side link hub central axis QB can be about ±90°.

In addition, an angle of traverse φ (FIG. 5) of the distal end side link hub 3 relative to the proximal end side link hub 2 can be set in a range of 0° to 360°. The bend angle θ means a vertical angle formed when the distal end side link hub central axis QB is inclined relative to the proximal end side link hub central axis QA. The angle of traverse φ means a horizontal angle formed when the distal end side link hub central axis QB is inclined relative to the proximal end side link hub central axis QA.

Posture altering of the distal end side link hub 3 relative to the proximal end side link hub 2 is performed, using as the rotation center an intersection O of the proximal end side link hub central axis QA and the distal end side link hub central axis QB. FIG. 1 shows a state where the proximal end side link hub central axis QA and the distal end side link hub central axis QB are on the same line. FIG. 2 shows a state where the distal end side link hub central axis QB has a certain operating angle relative to the proximal end side link hub central axis QA. Even when the posture is altered, a distance D (FIG. 5) between the proximal end side spherical link center PA and the distal end side spherical link center PB does not change.

In the parallel link mechanism 1, when the following conditions (1) to (4) are all satisfied, if the angular positional relationships between the intermediate link member 7 and the proximal side and distal side end link members 5, 6 with respect to the symmetry plane of the intermediate link member 7 are made identical in the proximal end side and the distal end side, a proximal side composed of the proximal end side link hub 2 and the proximal side end link member 5, and a distal side composed of the distal end side link hub 3 and the distal side end link member 6 will move in the same manner due to the geometrical symmetry.

Condition (1): the angles between the central axes O1 of the revolute pairs between the proximal side and distal side end link members 5, 6 and the proximal end side and distal end side link hubs 2, 3 in the link mechanisms 4 are identical with each other, and the lengths from the proximal end side and distal end side spherical link centers PA, PB to the corresponding revolute pairs are identical to each other.

Condition (2): in each link mechanism 4, the central axis O1 of the revolute pair between the proximal side/distal side end link member 5, 6 and the proximal end side/distal end side link hub 2, 3 and the central axis O2 of the revolute pair between the proximal side/distal side end link member 5, 6 and the intermediate link member 7 cross the proximal end side/distal end side spherical link center PA, PB.

Condition (3): the geometrical shape of the proximal side end link member 5 and the geometrical shape of the distal side end link member 6 are identical to each other.

Condition (4): Also with respect to the intermediate link member 7, the shape on the proximal end side and the shape on the distal end side are identical to each other.

As shown in FIG. 1 to FIG. 4, the proximal end side link hub 2 includes: a base 10 having a flat plate shape in which a circular through-hole 10a (FIG. 4) is formed at a center portion thereof; and three rotation shaft connection members 11 provided around the through-hole 10a in the base 10 at an equal interval in the circumferential direction. The center of the through-hole 10a is on the proximal end side link hub central axis QA. A first rotation shaft 12 whose axis crosses the proximal end side link hub central axis QA is rotatably coupled to each rotation shaft connection member 11. To each first rotation shaft 12, one end of its corresponding proximal side end link member 5 is coupled.

Figure 6:
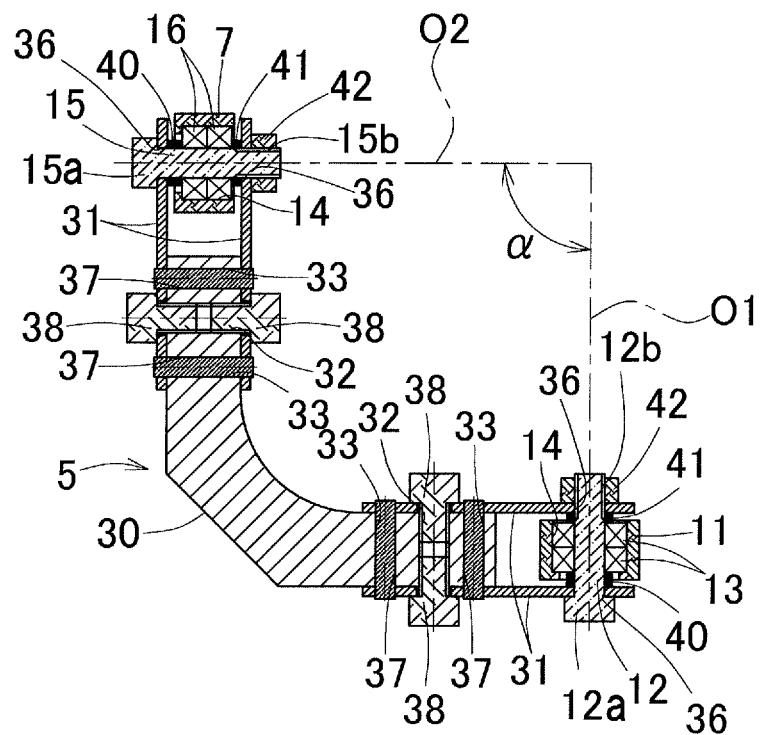
FIG. 6 is a cross-sectional view of one proximal side end link member of the parallel link mechanism and peripheries of opposite ends of the proximal side end link member.

FIG. 6 shows a state of one proximal side end link member 5 and peripheries of opposite ends thereof. As shown in FIG. 6, each first rotation shaft 12 has a head 12a having a larger diameter than that of the other portion at the outer diameter end, and a male screw portion 12b at the inner diameter end. In the example shown in FIG. 6, the rotation shaft 12 is coupled to the rotation shaft connection member 11 via two bearings 13. However, the first rotation shaft 12 may be coupled to the rotation shaft connection member 11 rotatably and in contact therewith. Each bearing 13 is a ball bearing such as a deep groove ball bearing, or an angular contact ball bearing, for example. The bearing 13 is set in a state of being embedded in an inner diameter groove 14 provided in the rotation shaft connection member 11, and is fixed through press-fitting, bonding, staking, or the like. This also applies to the kind and setting manner of bearings provided in other revolute pair portions.

To the other end of the proximal side end link member 5, a second rotation shaft 15 which is rotatably coupled to one end of the intermediate link member 7 is coupled. Similarly to the first rotation shaft 12 at the link hub 2, the second rotation shaft 15 of the intermediate link member 7 also has a head 15a having a larger diameter than that of the other portion at the outer diameter end, and a male screw portion 15b at the inner diameter end. In the example shown in FIG. 6, the second rotation shaft 15 is coupled to the intermediate link member 7 via two bearings 16, but may be coupled to the intermediate link member 7 rotatably and in contact therewith.

As shown in FIG. 1 to FIG. 3, the distal end side link hub 3 includes: a distal end member 20 having a flat plate shape in which a circular through-hole 20a (FIG. 2) is formed in a center portion thereof; and three rotation shaft connection members 21 provided around the through-hole 20a in the distal end member 20 at an equal interval in the circumferential direction. The center of the through-hole 20a is on the distal end side link hub central axis QB. A third rotation shaft 22 whose axis crosses the distal end side link hub central axis QB is rotatably coupled to each rotation shaft connection member 21.

To each third rotation shaft 22 at the distal end side link hub 3, one end of its corresponding distal side end link member 6 is coupled. To the other end of distal side end link member 6, a fourth rotation shaft 25 which is rotatably coupled to the other end of the intermediate link member 7 is coupled. The third rotation shaft 22 at the link hub 3, and the fourth rotation shaft 25 at the intermediate link member 7 have the same shape as that of the first and second rotation shafts 12 and 15, and are rotatably coupled to the rotation shaft connection member 21 and the other end of the intermediate link member 7 via two bearings (not shown), respectively.

Figure 7:
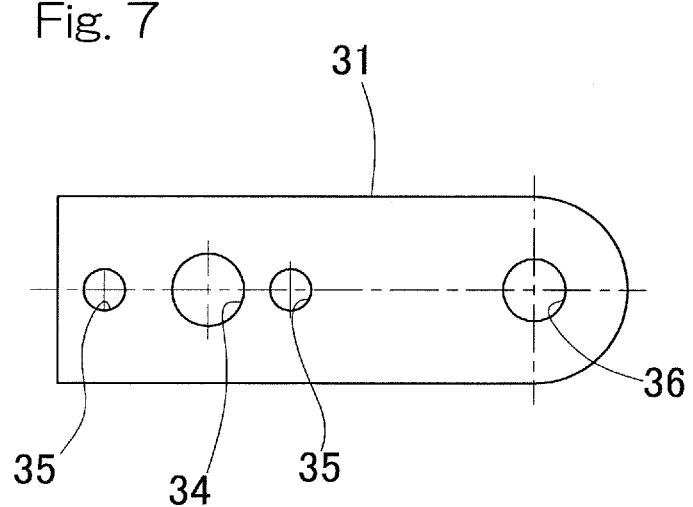
FIG. 7 is a front view of a rotation shaft support member of the proximal side end link member.

The configurations of the proximal side and distal side end link members 5, 6 will be described with reference to FIG. 6 and FIG. 7. Since the proximal side and distal side end link members 5, 6 have the same configuration with each other, the proximal side end link member 5 will be described as a representative. As shown in FIG. 6, the proximal side end link member 5 includes: one curved member 30; and four rotation shaft support members 31 in total which are fixed to the lateral surface on the outer diameter side and the lateral surface on the inner diameter side of each of opposite ends of the curved member 30. The four rotation shaft support members 31 each have the same shape with each other.

The curved member 30 is a cast article made from a metal material, for example, and has a shape curved by a predetermined angle α (90° in this example). Each of the opposite ends of the curved member 30 is provided with one bolt thread hole 32 penetrating the lateral face on the outer diameter side and the lateral face on the inner diameter side, and two positioning holes 33 located at both sides of this bolt screw hole 32.

Each rotation shaft support member 31 is made in a predetermined shape by a plate-shaped member having a constant thickness such as a metal plate being subjected to processing such as sheet metal working. As shown in FIG. 7, for example, the rotation shaft support member 31 has an elongate rectangular shape or square shape, in which one end in the longitudinal direction thereof is in an angular shape and the other end thereof is in a semicircular shape. The one end having the angular shape is provided with one bolt insertion hole 34 corresponding to the bolt thread hole 32 in the curved member 30, and two positioning holes 35 corresponding to the positioning holes 33 in the curved member 30. The semicircular other end is provided with a through-hole 36 in which one of the first to fourth rotation shafts 12, 15, 22, 25 is inserted.

As the material for the rotation shaft support member 31, a plate-shaped member having a constant thickness, which is in a simple shape, is used, whereby a rotation shaft support member 31 which is inexpensive and excellent in mass productivity can be realized. In particular, when a metal plate is used as the material, contour shaping and processing of holes 34, 35, 36 is easy.

Fixation of the curved member 30 and the rotation shaft support members 31 is performed in the following procedure. First, a positioning pin 37 is inserted in the positioning hole 33 in the curved member 30 and the positioning hole 35 in each of the rotation shaft support members 31 on the outer diameter side and the inner diameter side, thereby performing positioning. In this state, bolts 38 are inserted from the outer diameter side and the inner diameter side, into the bolt insertion hole 34 of each rotation shaft support member 31, and the thread portion of each bolt 38 is caused to be engaged with the bolt thread hole 32 in the curved member 30. In this manner, the rotation shaft support members 31 on the outer diameter side and the inner diameter side are individually fixed by means of the bolts 38 to the curved member 30 so as to face each other.

By using the positioning pins 37 in this manner, assembling work is rendered to be easy, and thus, variation in accuracy of assembling performed by an operator is reduced. In addition, since accuracy in the positional relationship between the curved member 30 and the rotation shaft support members 31 is improved, smooth operation of the parallel link mechanism 1 can be realized.

Between the semicircular other ends of the two rotation shaft support members 31 on the outer diameter side and the inner diameter side, one end of the rotation shaft connection member 11 of the proximal end side link hub 2 (the intermediate link member 7) is disposed. The first rotation shaft 12 (the second rotation shaft 15) of the rotation shaft connection member 11 (intermediate link member 7) is inserted into the through-holes 36 in the rotation shaft support members 31, the inner rings of the bearings 13 (16), and holes of spacers 40, 41 interposed between the inner rings and the rotation shaft support members 31.

A nut 42 is caused to be thread-engaged with the male screw portion 12b (15b) of the first rotation shaft 12 (the second rotation shaft 15), whereby both the rotation shaft support members 31 on the outer diameter side and the inner diameter side, the inner rings of the bearings 13 (16), and the spacers 40, 41 are sandwiched by the nut 42 and the head 12a (15a) of the first rotation shaft 12 (the second rotation shaft 15). Accordingly, in a state where a preload is applied to the bearings 13 (16), the proximal side end link member 5 is coupled to the first rotation shaft 12 (the second rotation shaft 15).

As described above, by supporting the opposite ends of the first rotation shaft 12 (the second rotation shaft 15) by the two rotation shaft support members 31 on the outer diameter side and the inner diameter side, the rigidity against moment load of the revolute pair portion is increased, and the rigidity of the entirety of the parallel link mechanism 1 is improved.

An assembling procedure will be described, using the revolute pair portion between the proximal end side link hub 2 and the proximal side end link member 5 as an example. First, the rotation shaft support member 31 on the outer diameter side is positioned relative to the curved member 30 by the positioning pins 37, and then, is fixed with a bolt 38. Subsequently, the first rotation shaft 12 is inserted from the outer diameter side into the through-hole 36 in this fixed rotation shaft support member 31 on the outer diameter side. The spacer 40, the inner rings of the bearings 13 set in the rotation shaft connection member 11 and the spacer 41 are fitted to this first rotation shaft 12 in this order, from the inner diameter side. Then, the first rotation shaft 12 is inserted into the through-hole 36 in the rotation shaft support member 31 on the inner diameter side. Thereafter, the rotation shaft support member 31 on the inner diameter side is positioned relative to the curved member 30 by the positioning pins 37, and then, is fixed with a bolt 38. Finally, the nut 42 is caused to be thread-engaged with the male screw portion 12b of the first rotation shaft 12, and the nut 42 is fastened to be fixed under a predetermined torque.

In this manner, since the bearings 13 and the spacers 40, 41, which are components of the revolute pair portion between the proximal side end link member 5 and the proximal end side link hub 2, can be inserted to the first rotation shaft 12 from one direction, assemblability is good. The reason why the bearings 13 and the spacers 40, 41 are inserted to the first rotation shaft 12 from the inner diameter side is as follows. If the bearings 13 and the spacers 40, 41 are to be inserted from the outer diameter side, the work of inserting the bearings 13 and the like has to be performed while the proximal side end link member 5 (in a state where one rotation shaft support member 31 is not fixed to the curved member 30) is located on the inner diameter side of the revolute pair portion relative to the first rotation shaft 12. This could cause the proximal side end link member 5 to interfere with other link mechanisms 4.

The above-described method for assembling the revolute pair portion is not limited to the assembling of the revolute pair portion between the proximal side end link member 5 and the proximal end side link hub 2, but can be similarly applied to the assembling of the revolute pair portion between the proximal side end link member 5 and the intermediate link member 7, the revolute pair portion between the distal side end link member 6 and the distal end side link hub 3, and the revolute pair portion between the distal side end link member 6 and the intermediate link member 7. The reason why such an assembling method is allowed is that each of the proximal side and distal side end link members 5, 6 is divided into two kinds of members, i.e., the curved member 30 and the rotation shaft support member 31.

In addition, when each of the proximal side and distal side end link members 5, 6 is divided into two kinds of members i.e., the curved member 30 and the rotation shaft support member 31, the members 30, 31 can be made in a simple shape, which can suppress processing cost and thus improve mass productivity. Further, as in the present embodiment, when the four rotation shaft support members 31 have an identical shape with each other for one proximal side/distal side end link member 5, 6, common use of components is achieved, which can realize a low price and good mass productivity. However, depending on the areas where the rotation shaft support members 31 are used and/or the required strengths of the rotation shaft support members 31, the thickness and/or the shape of the rotation shaft support members 31 may be made different.

As in the present embodiment, when each of the proximal side and distal side end link members 5, 6 includes one curved member 30 and four rotation shaft support members 31 in total which are fixed to the lateral face on the outer diameter side and the lateral face on the inner diameter side of each of opposite ends of the curved member 30, even if the specification of the parallel link mechanism 1 is changed, components can be used in common. For example, when the size of the parallel link mechanism 1 is to be changed, only the shape of the curved member 30 is changed, and the rotation shaft support member 31 and the first to fourth rotation shafts 12, 15, 22, 25 can be used in common.

Further, when the sizes of the bearings 13, 16 to be used in the revolute pair portions between the proximal side and distal side end link members 5, 6 and the proximal end side and distal end side link hubs 2, 3, and in the revolute pair portions between the proximal side and distal side end link members 5, 6 and the intermediate link members 7 are to be changed, the shapes of the rotation shaft support member 31 and the first to fourth rotation shafts 12, 15, 22, 25 are changed, and the curved member 30 can be used in common.

In the present embodiment, fixation of the curved member 30 and the rotation shaft support members 31 is realized by causing the bolts 38 to be thread-engaged with the bolt thread hole 32 provided in the curved member 30, but may be realized in another manner. For example, the fixation may be realized in the following manner: a drilled hole is provided in the curved member 30; then, a bolt is inserted in this drilled hole and a nut is caused to be thread-engaged with the bolt, whereby the curved member 30 and the rotation shaft support members 31 are fixed by sandwiching the members 30 and 31 by the nut and the head portion of the bolt. Alternatively, the fixation may be realized through welding or the like.

Another configuration of the proximal side and distal side end link members 5, 6 will be described. In the example below, the proximal side end link member 5 will be shown, but the distal side end link member 6 has the same configuration. In the proximal side end link member 5 shown in FIG. 8, the rotation shaft support member 31 on the outer diameter side is positioned by the positioning pins 37, but the rotation shaft support member 31 on the inner diameter side is not positioned by the positioning pins 37. If either one of the rotation shaft support members 31 on the outer diameter side and the inner diameter side is positioned, normally required assembling accuracy can be obtained. With this configuration, compared with the configuration shown in FIG. 6, assemblability is improved.

Figure 8:
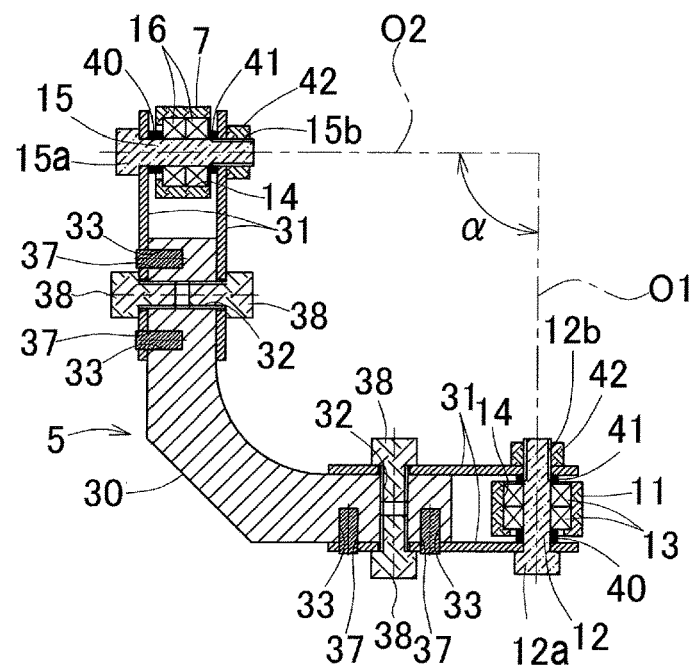
FIG. 8 is a cross-sectional view of a different proximal side end link member and peripheries of opposite ends thereof.
Figure 9:
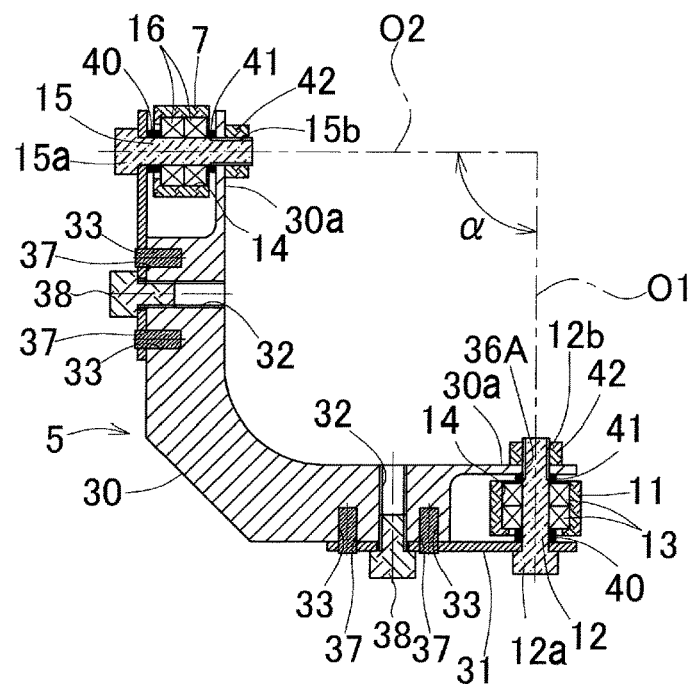
FIG. 9 is a cross-sectional view of a still different proximal side end link member and peripheries of opposite ends thereof.

The proximal side end link member 5 shown in FIG. 9 has a configuration which is obtained by further changing the configuration shown in FIG. 8 and in which the rotation shaft support member 31 is fixed only to the lateral face on the outer diameter side at each of the opposite ends of the curved member 30. Instead of the rotation shaft support members 31 on the inner diameter side in the configuration shown in FIG. 8, rotation shaft support portions 30a are provided to the curved member 30. Each rotation shaft support portion 30a is provided with a through-hole 36A that corresponds to the through-hole 36 in the rotation shaft support member 31.

In the case of this configuration, assembling of the revolute pair portion is performed in the following manner. First, the first rotation shaft 12 is inserted from the outer diameter side into the through-hole 36 in the rotation shaft support member 31. Then, and the spacer 40, the inner rings of the bearings 13 set in the rotation shaft connection member 11 and the spacer 41 are fitted to the first rotation shaft 12 in this order from the inner diameter side. Subsequently, while the first rotation shaft 12 is being inserted in the through-hole 36A in the rotation shaft support portion 30a, the rotation shaft support member 31 is positioned by the positioning pins 37 relative to the curved member 30, and then, the rotation shaft support member 31 is fixed to the curved member 30 with the bolt 38. Finally, a nut 42 is caused to be thread-engaged with the male screw portion 12b of the first rotation shaft 12, and this nut 42 is fastened and fixed under a predetermined torque. Inversely to the example shown in FIG. 9, a configuration may be employed in which the rotation shaft support portion 30a is provided on the outer diameter side and the rotation shaft support member 31 is fixed to the lateral face on the inner diameter side at each of the opposite ends of the curved member 30.

Figure 10:
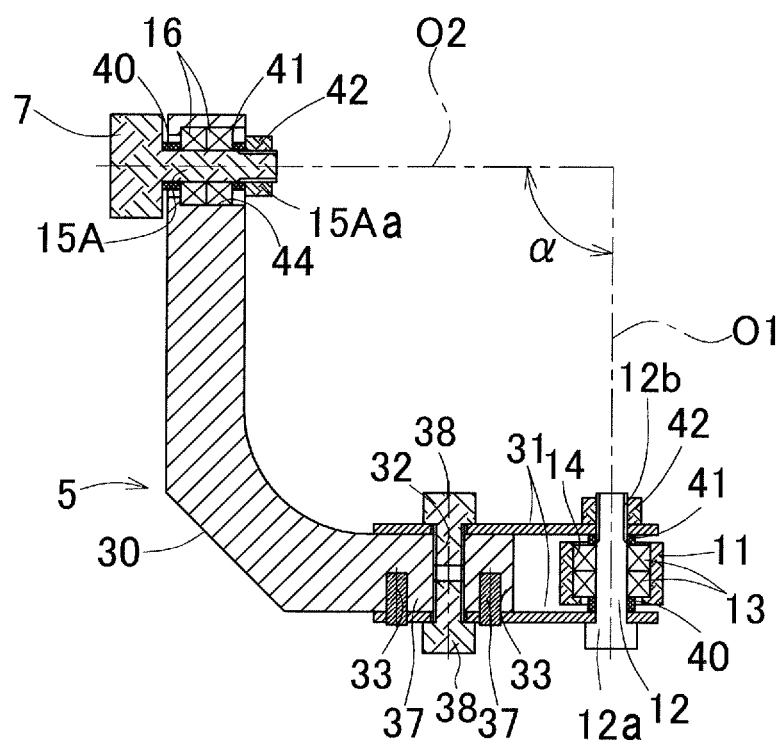
FIG. 10 is a cross-sectional view of a further different proximal side end link member and peripheries of opposite ends thereof.

The proximal side end link member 5 shown in FIG. 10 is obtained by changing the configuration of the revolute pair portion between the proximal side end link member 5 and the intermediate link member 7 of the example shown in FIG. 8. The proximal side end link member 5 includes the curved member 30 and two rotation shaft support members 31 fixed to an end portion on the link hub side of the curved member 30. The bearings 16 are embedded in the intermediate link member 7 in the example shown in FIG. 8, whereas, in FIG. 10, the bearings 16 are embedded in an inner diameter groove 44 provided in the proximal side end link member 5.

The spacer 40, the inner rings of the bearings 16, and the spacer 41 are fitted to a rotation shaft portion 15A provided to the intermediate link member 7, and a nut 42 is caused to be thread-engaged with a male screw portion 15Aa of the rotation shaft portion 15A, so as to fix the rotation shaft portion 15A to the proximal side end link member 5. The rotation shaft portion 15A may be a rotation shaft separate from the intermediate link member 7. The revolute pair portion between the proximal end side link hub 2 and the proximal side end link member 5 may have the same configuration as described above.

Figure 11:
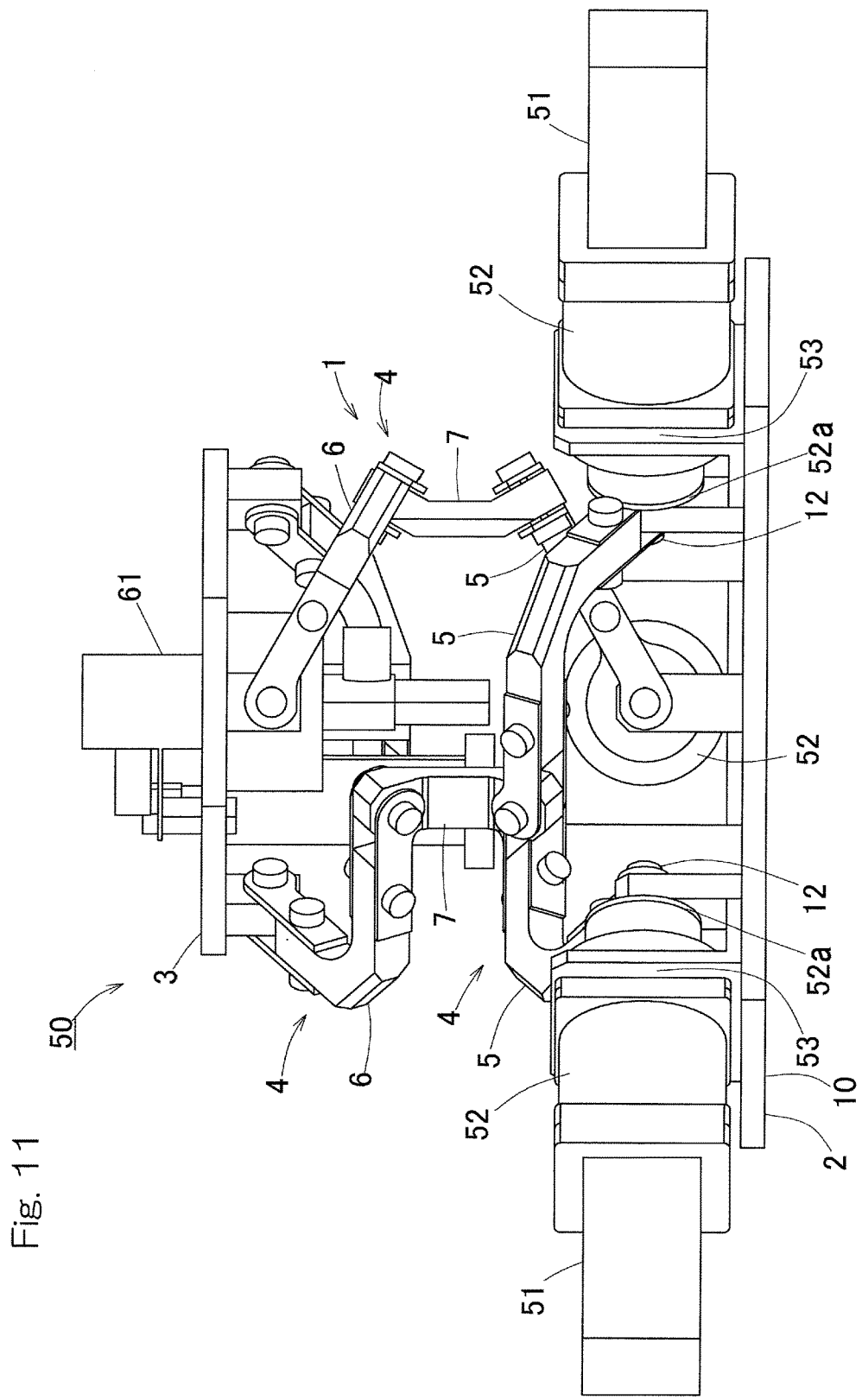
FIG. 11 is a front view showing a state where a link actuation device according to a preferred embodiment of the present invention is used.
Figure 12:
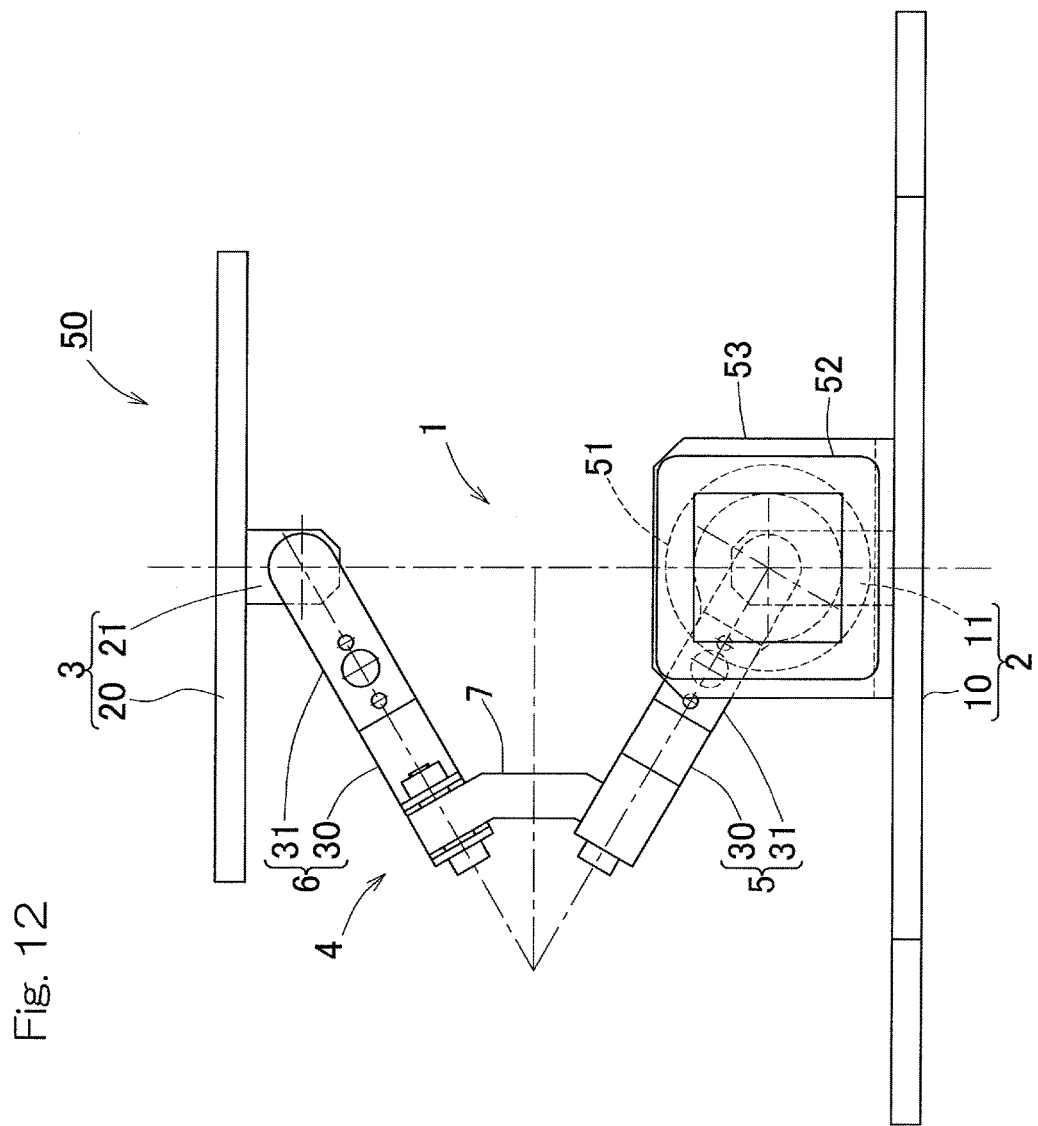
FIG. 12 is a front view of the link actuation device with part thereof omitted.
Figure 13:
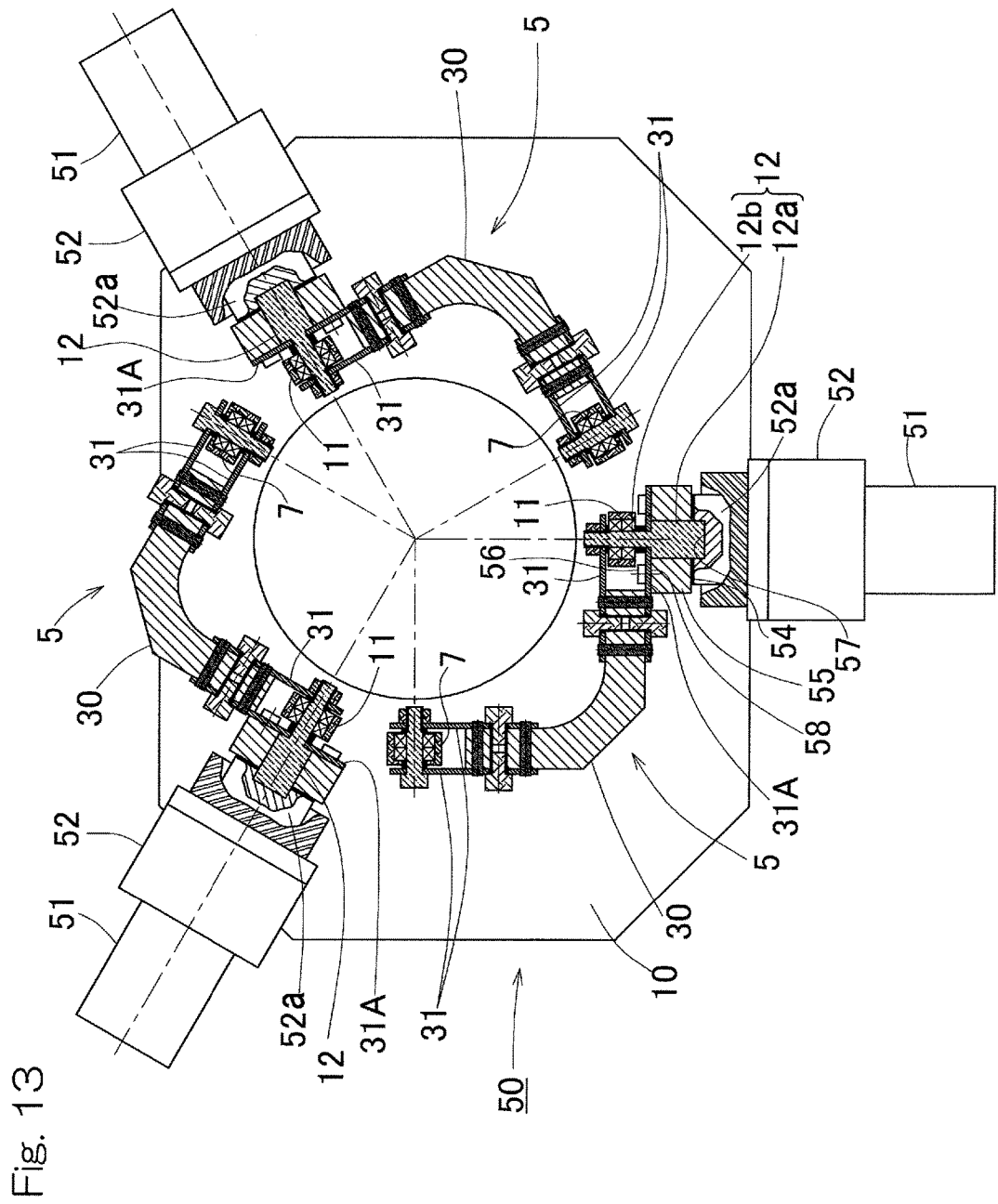
FIG. 13 is a cross-sectional view of a proximal end side link hub, proximal side end link members, and the like of the link actuation device.

FIG. 11 to FIG. 14 show a link actuation device according to a preferred embodiment of the present invention. This link actuation device 50 includes the parallel link mechanism 1 shown in FIG. 1 to FIG. 7, in which as shown in FIG. 11 to FIG. 13, each of the three link mechanisms 4 is provided with a posture altering actuator 51 for arbitrarily changing the posture of the distal end side link hub 3 relative to the proximal end side link hub 2.

Each posture altering actuator 51 is a rotary actuator provided with a speed reducing mechanism 52, and is installed, on the upper surface of the base 10 of the proximal end side link hub 2, on the same axis of the first rotation shaft 12. The posture altering actuator 51 and the speed reducing mechanism 52 are integrally provided with each other, and the speed reducing mechanism 52 is fixed to the base 10 by a motor fixation member 53. It should be noted that if at least two of the three link mechanisms 4 are each provided with the posture altering actuator 51, the posture of the distal end side link hub 3 relative to the proximal end side link hub 2 can be determined.

In FIG. 13, the speed reducing mechanism 52 is a flange output type, and includes an output shaft 52a having a large diameter. The tip end surface of the output shaft 52a is a flat flange surface 54 perpendicular to the center line of the output shaft 52a. The output shaft 52a is connected, via a spacer 55 with the use of bolts 56, to the rotation shaft support member 31 on the outer diameter side of the proximal side end link member 5. The first rotation shaft 12 of the revolute pair portion between the proximal side end link member 5 and the proximal end side link hub 2 includes a large diameter portion 12a and a small diameter portion 12b. The small diameter portion 12b is inserted in the inner rings of the bearings 13, and the large diameter portion 12a is fitted in an inner diameter groove 57 provided in the output shaft 52a of the speed reducing mechanism 52.

Figure 14:
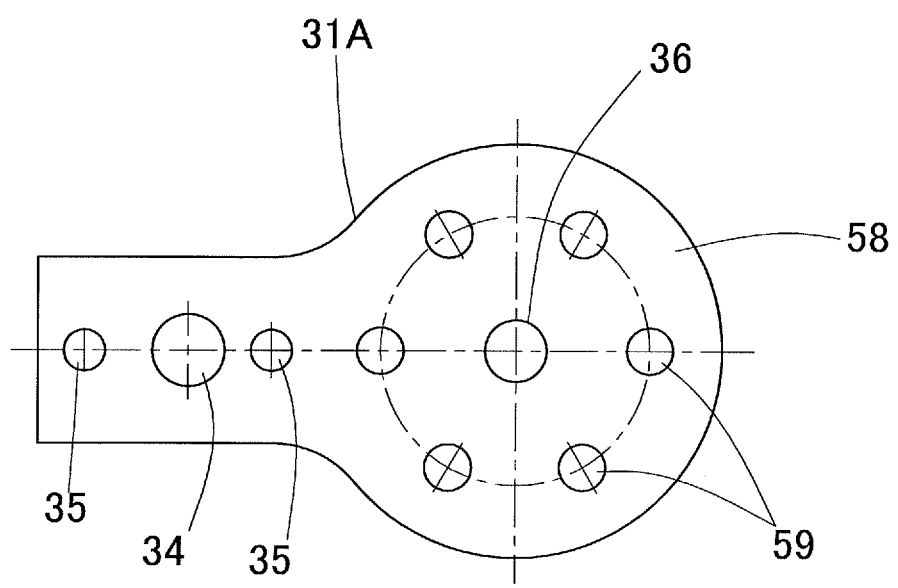
FIG. 14 is a front view of a rotation shaft support member of an end link member of the link actuation device.

Similarly to the proximal side end link member 5 shown in FIG. 6, the proximal side end link member 5 includes one curved member 30 and four rotation shaft support members 31 in total which are fixed to the lateral face on the outer diameter side and the lateral face on the inner diameter side of each of the opposite ends of the curved member 30. The four rotation shaft support members 31 do not have an identical shape. A rotation shaft support member 31A on the outer diameter side provided to the revolute pair portion relative to the proximal end side link hub 2 has a flange mounting surface 58 which is joined via the spacer 55 to the flange surface 54 of the speed reducing mechanism 52. As shown in FIG. 14, the flange mounting surface 58 is in a circular shape that corresponds to the flange surface 54 of the output shaft 52a. The flange mounting surface 58 is provided, at a center portion thereof, with a through-hole 36 into which the first rotation shaft 12 is inserted. Around this through-hole 36 in the flange mounting surface 58, a plurality of bolt insertion holes 59 into which the bolts 56 are respectively inserted are provided at an equal interval in the circumferential direction.

As shown in FIG. 11, for example, the link actuation device 50 is used with an end effector 61 installed on the distal end side link hub 3. The posture altering actuators 51 alter the posture of the distal end side link hub 3 relative to the proximal end side link hub 2, whereby the angle in two degrees of freedom of the end effector 61 can be controlled. Since the rotary actuator provided with the speed reducing mechanism 52 is used as the posture altering actuator 51, allowable load can be improved. Since the ratio of moment of inertia can be reduced, fast operation can be realized.

Figure 15:
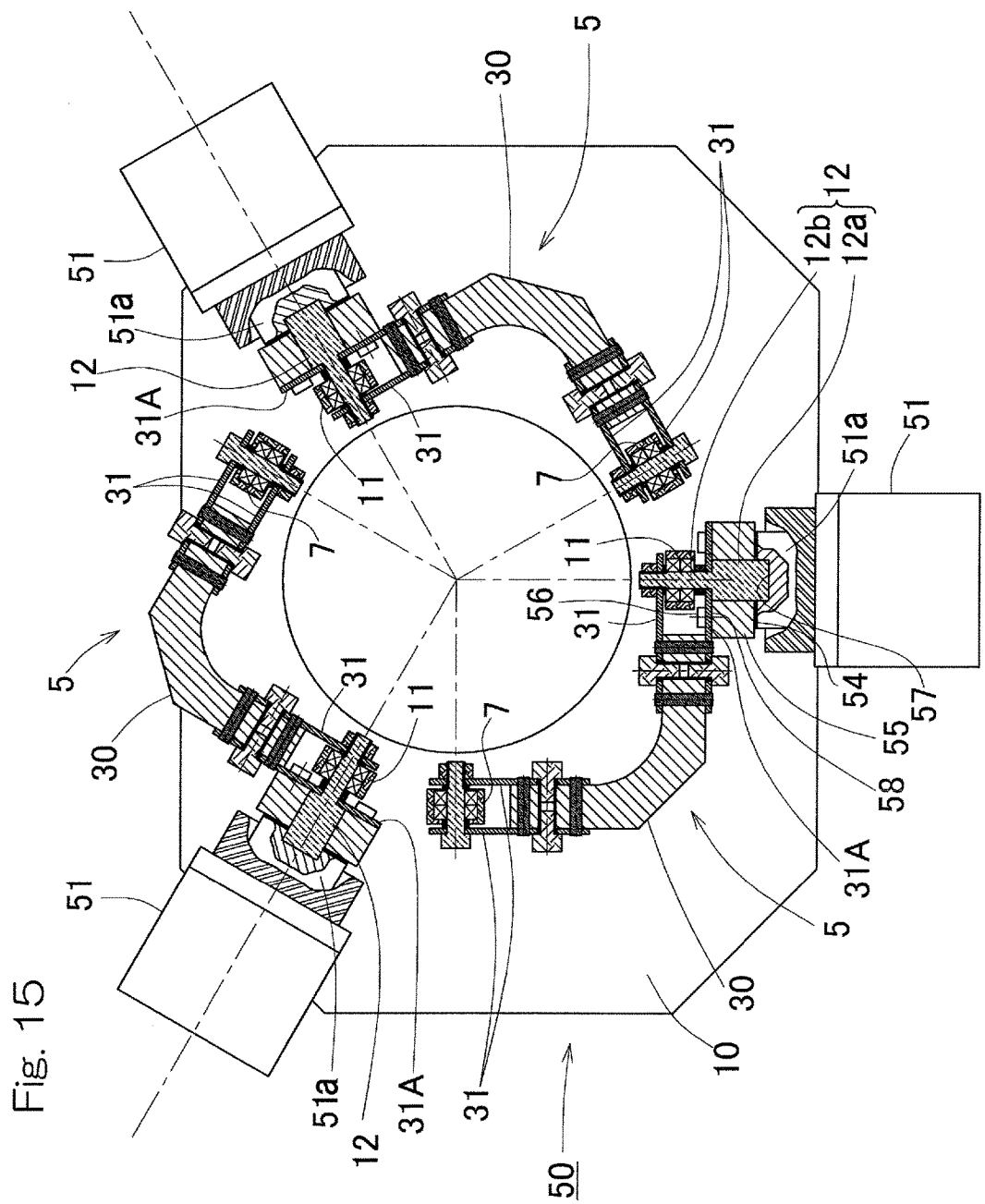
FIG. 15 is a cross-sectional view of a proximal end side link hub, proximal side end link members, and the like of a different link actuation device.

In the link actuation device 50 having this configuration, each posture altering actuator 51 is a rotary actuator, and the output shaft 52a of the speed reducing mechanism 52 of the posture altering actuator 51 is of a flange output type. Accordingly, the posture altering actuator 51 can be directly installed to the parallel link mechanism 1. This allows a drive mechanism section to have a simple structure, and thus, an inexpensive link actuation device 50 can be realized. As shown in FIG. 15, without the speed reducing mechanism provided, an output shaft 51a of the posture altering actuator 51 may be of a flange output type. In such a case, the tip end surface of the output shaft 51a of the posture altering actuator 51 serves as the flange surface 54 to be joined to the flange mounting surface 58 of the rotation shaft support member 31A.

The present invention is not limited to the above embodiments, and various additions, modifications, and omissions can be made without departing from the gist of the present invention. For example, although in the embodiment shown in FIG. 11 to FIG. 14, the speed reducing mechanism 52 is mounted to the rotation shaft support member 31A via the spacer 55, if there is no problem such as interference between the parallel link mechanism 1 and the posture altering actuator 51, the speed reducing mechanism 52 may be directly installed to the rotation shaft support member 31A. Further, the posture altering actuator 51 or the speed reducing mechanism 52 of a key output type may be used, and in this case, the rotation shaft 12 may be coupled to the output shaft of the speed reducing mechanism 52 or of the posture altering actuator 51 by means of coupling (not shown). Thus, such a configuration is also encompassed in the scope of the present invention.

REFERENCE NUMERALS

1 . . . parallel link mechanism
2 . . . proximal end side link hub
3 . . . distal end side link hub
4 . . . link mechanism
5 . . . proximal side end link member
6 . . . distal side end link member
7 . . . intermediate link member
12 . . . first rotation shaft
13, 16 . . . bearing
15 . . . second rotation shaft
22 . . . third rotation shaft
25 . . . fourth rotation shaft
30 . . . curved member
31 . . . rotation shaft support member
36 . . . through-hole
37 . . . positioning pin
50 . . . link actuation device
51 . . . posture altering actuator
51a . . . output shaft
52 . . . speed reducing mechanism
52a . . . output shaft
54 . . . flange surface

What is claimed is:
1. A parallel link mechanism comprising:
a proximal end side link hub;
a distal end side link hub; and
three or more link mechanisms which each couple the distal end side link hub to the proximal end side link hub such that a posture of the distal end side link hub can be altered relative to the proximal end side link hub, wherein
each of the link mechanisms includes:
a proximal side end link member having one end rotatably coupled to the proximal end side link hub;
a distal side end link member having one end rotatably coupled to the distal end side link hub; and
an intermediate link member having opposite ends rotatably coupled to other ends of the proximal side and distal side end link members, respectively, and
each of the proximal side and distal side end link members includes:
a curved member which is curved by an angle; and
a rotation shaft support member fixed to one end of or each of opposite ends of the curved member, the rotation shaft support member being configured to support a rotation shaft rotatably coupled directly or via a bearing to the intermediate link member or one of the proximal end side and distal end side link hubs.

2. The parallel link mechanism as claimed in claim 1, wherein
the rotation shaft support member is a plate-shaped member which has a constant thickness and which is provided with a through-hole into which the rotation shaft, or the rotation shaft and the bearing are inserted.

3. The parallel link mechanism as claimed in claim 2, wherein
the plate-shaped member having the constant thickness is a metal plate.

4. The parallel link mechanism as claimed in claim 1, wherein
the rotation shaft support member is fixed to the curved member with the rotation shaft support member positioned by a positioning pin.

5. The parallel link mechanism as claimed in claim 1, wherein,
each of the proximal side and distal side end link members includes two or more of the rotation shaft support members, and
the two or more rotation shaft support members support opposite ends of the rotation shaft.

6. The parallel link mechanism as claimed in claim 5, wherein
the two or more rotation shaft support members have an identical shape with each other.

7. The parallel link mechanism as claimed in claim 5, wherein
each of the proximal side and distal side end link members includes two or more of the rotation shaft support members at each of opposite ends thereof, and
the two or more rotation shaft support members at one end support opposite ends of the rotation shaft rotatably coupled to the intermediate link member and the two or more rotation shaft support members at the other end support opposite ends of the rotation shaft rotatably coupled to a corresponding one of the proximal end side and distal end side link hubs.

8. A link actuation device comprising the parallel link mechanism as claimed in claim 1, wherein
two or more link mechanisms of the three or more link mechanisms are each provided with a posture altering actuator configured to arbitrarily alter the posture of the distal end side link hub relative to the proximal end side link hub.

9. The link actuation device as claimed in claim 8, wherein
the posture altering actuator is a rotary actuator whose output shaft has a flange surface perpendicular to a center line of the output shaft,
the proximal side end link member has the rotation shaft support member configured to support the rotation shaft rotatably coupled to the proximal end side link hub, and
the rotation shaft support member is joined to the flange surface of the posture altering actuator.

10. The link actuation device as claimed in claim 8, wherein
the posture altering actuator is a rotary actuator provided with a speed reducing mechanism,
an output shaft of the speed reducing mechanism has a flange surface perpendicular to a center line of the output shaft,
the proximal side end link member has the rotation shaft support member configured to support the rotation shaft rotatably coupled to the proximal end side link hub, and
the rotation shaft support member is joined to the flange surface of the posture altering actuator.

* * * * *